Aug. 16, 1966  W. F. MOTT ETAL  3,266,812
CHUCK WITH WORK-PIECE SEATING MEANS

Filed April 23, 1965  2 Sheets-Sheet 1

INVENTORS
WALTER F. MOTT
NORMAN E. RANK

BY *Gullen, Sloman & Cantor*

ATTORNEYS

INVENTORS
WALTER F. MOTT
NORMAN E. RANK

BY Cullen, Sloman & Cantor

ATTORNEYS

United States Patent Office 3,266,812
Patented August 16, 1966

3,266,812
CHUCK WITH WORK-PIECE SEATING MEANS
Walter F. Mott, 23142 Rosedale Court, St. Clair Shores, Mich., and Norman E. Rank, 3062 Middleton Court, Birmingham, Mich.
Filed Apr. 23, 1965, Ser. No. 450,377
5 Claims. (Cl. 279—121)

This invention relates to a chuck with work-piece seating means and more particularly to a movable jaw type of chuck having means for forcefully positioning the work-piece against a rest pad formed upon the chuck.

In conventional three and four jaw chuck, the jaws are moved together to grip the work-piece therebetween, thus locating the work-piece relative to the axis of the chuck. However, the normal tolerances required for the movement of the chuck jaws, plus normal wear which causes dimensional "sloppiness," results in the jaws being somewhat loose relative to the chuck body so that as they are tightened together against the work-piece, they tend to cock or tilt relative to the chuck axis. Such movement of the jaws thus results in the work-piece being moved slightly forwardly of the chucking face of the chuck as the jaws are tightened upon it.

In many manufacturing operations, the unwanted cocking of the chuck jaws has little, if any, significance in processing the work-piece. However, in some manufacturing operations, it is important not only to locate the work-piece relative to the axis of the chuck, but also to fix the work-piece against a predetermined surface or location upon the chuck body, these normally being in the form of rest pads having a surface for engaging the work-piece.

When the jaws cock during tightening, the work-piece tends to spring away from or forwardly of the rest pad rest surface, thus resulting in dimensional inaccuracies in further machining of the work-piece.

Hence, it is the object of this invention to provide a means for forcefully holding and drawing the work-piece against the rest pad surface while the chuck jaws are tightened, with such means including the usual draw bar which is used for tightening the chuck jaws, so that the draw bar performs a second function, namely, the function of forcefully positioning the work-piece against the chuck rest pads.

A further object of this invention is to provide a means wherein a conventional three or four jaw chuck, particularly one that has experienced considerable wear and thus wherein the fits between the jaw and the jaw slides are "sloppy," is provided with an adapter mechanism which compensates for the tendency of the jaws to cock and which forcefully draws the work-piece against the rest pad, overcoming the tendency of the jaws to move the work-pieces off the rest pads.

These and other objects and other advantages of this invention will become apparent upon reading the following description of which the attached drawings form a part.

Figure 1:
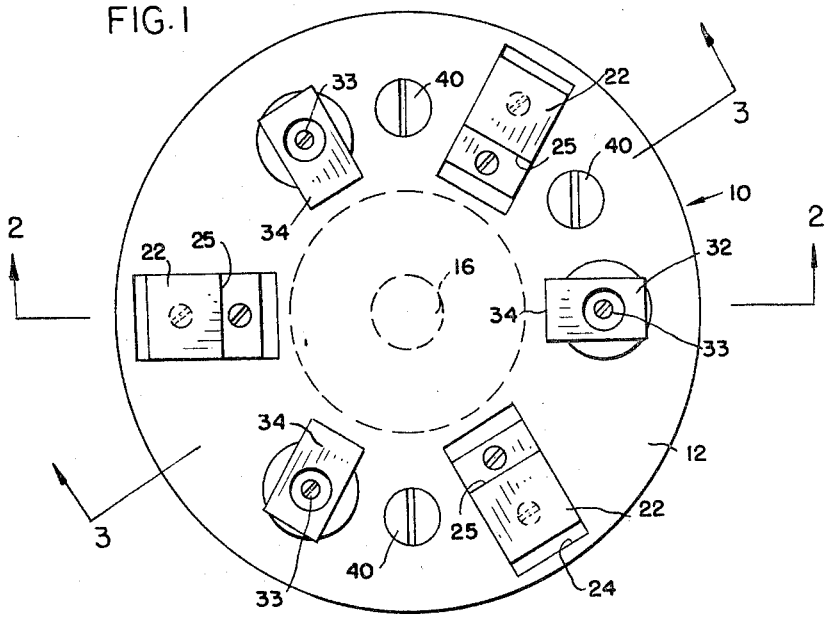
FIG. 1 is a front end view of the chuck herein.
Figure 2:
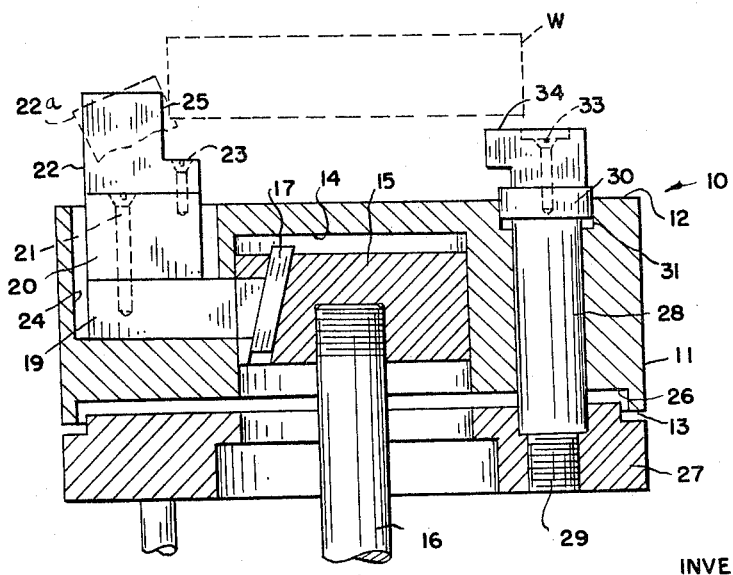
FIG. 2 is a cross-sectional view taken in the direction of arrows 2—2 of FIG. 1.

Referring to FIGS. 1 and 2, the chuck 10 comprises a cylindrically shaped body 11 having an outer, chucking face 12 and an opposite or inner face 13, with a central opening 14. Fitted within the central opening is a conventional wedge cylinder 15 to which is fastened the conventional draw bar 16 for slidably moving the wedge cylinder along the chuck axis.

The wedge cylinder is provided with a number of wedge slots 18 within which wedge keys 17 of jaw slides 19 are fitted. The slots and keys are arranged at an angle to the axis of the chuck so that movement of the wedge cylinder upwardly or downwardly (in FIG. 2) results in the wedge slide 19 moving inwardly or outwardly as the case may be.

Each slide is provided with a sub-jaw 20 fastened thereto by means of screws 21. Work-piece grip jaws 22 are fastened to each of the sub-jaws by means of screws 23 or the like, with the jaw assemblies fitting within openings 24 formed in the body 11 of the chuck. Each jaw 22 is provided with a work-piece grip face 25 to grip against a work-piece W.

The above construction is conventional and in normal operation, movement of the draw bar 16 results in the jaws 22 moving inwardly, against the work-piece W to grip the work-piece and center it relative to the axis of the chuck body. Reverse movement of the draw bar moves the jaws outwardly to release the work-piece.

The novelty herein relates to the following described mechanism:

The inner face 13 of the chuck body 11 is dished or recessed at 26 and a support plate 27 is closely arranged in parallelism therewith. Guide posts 28, screw connected at 29 to the plate, are arranged perpendicular to the plate and chuck body and extend through the openings formed in the chuck body. The outer or free end of each post terminates in a shoulder forming head 30 which cooperates with a counterbore formed shoulder 31 in the chuck body to thus loosely secure the chuck body and the plate together, while permitting the chuck body to slide towards and away from the plate, with the outward movement of the chuck body relative to the plate being limited to the point where the head 30 engages the counterbore shoulder 31.

A work-piece rest means or pad 32 is fastened by means of a screw 33 to the free end of each guide post 28 and is provided with a work-piece rest surface 34. The rest means is therefore stationary relative to plate 27.

Figure 3:
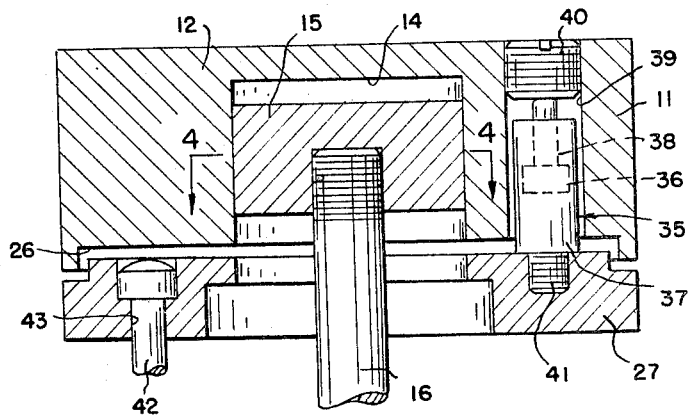
FIG. 3 is a cross-sectional view taken in the direction of arrows 3—3, but omitting the chuck jaws.
Figure 4:
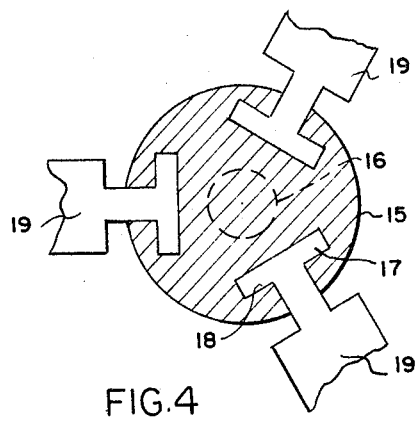
FIG. 4 is a cross-sectional view taken in the direction of arrows 4—4 of FIG. 3.

The chuck body and the plate are normally spring biased apart for their maximum distance, that is, to the point where the head 30 engages the shoulder 31, by a suitable spring means. As shown in FIG. 3, such spring means may be formed of a "liquid spring" 35 which comprises a piston 36 fitted into a cylinder 37 and secured to a piston rod 38 which extends out the upper end of the cylinder, with the cylinder being fitted into a loose bore 39 formed in the chuck body. The cylinder may be filled with a suitable liquid of the type which may be compressed upon application of sufficient force, such being available on the market and being known in the art.

An adjusting set screw 40 bears against the upper end of the piston rod 38 to adjust the initial tension of the liquid spring and the lower end of the cylinder 37 is provided with a threaded stud 41 which threadedly engages the plate 27.

In addition, the plate 27 is provided with a number of bolts 42 fitted through bores 43 in the plate for connecting the plate to a machine tool or fixed support (not shown).

In operation, the plate is fastened to a machine tool or fixed support and the draw bar 16 is connected to the usual and conventional mechanism for operating such draw bars, and then the work-piece is positioned between the jaws 22. Movement of the draw bar 16 operates the wedge keys within their slots to thus slide the jaws until their grip faces 25 engage the work-piece W and tighten about such work-piece to hold it in axial alignment with the chuck body.

Where the jaws are loose due to normal tolerances or due to wear, the jaws cock to some extent as shown in dotted line in fragment and indicated as 22a in FIG. 2, with the result that the work-piece W moves away from the rest surface 34.

When the draw bar completes its action of tightening the jaws about the work-piece W, further movement of the draw bar provides a force to overcome the force of the liquid spring 35 and thereby pull the chuck body towards the support plate. Since the rest means 32 is fastened to the posts 28 which are immovably fastened in turn to the plate 27, while the chuck body moves toward the plate, the rest remains stationary and thus the work-piece seats upon the rest and is held there by the pull on the draw bar.

To disengage the work-piece the draw bar is moved in the opposite direction which results in separation of the chuck body and the plates due to the spring means 35 and then opening of the jaws 22 to thereby permit removal of the work-piece.

Figure 5:
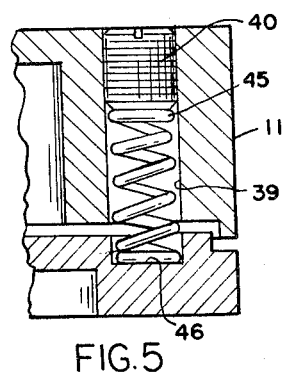
FIG. 5 is a fragmentary, cross-sectional view of a portion of the chuck showing a modified spring means.

FIG. 5 illustrates a modified spring means wherein a conventional compression, coil spring 45 is used instead of tthe liquid spring 35 and its lower end fits into a socket 46 formed into the plate. The construction and operation of this modification is otherwise the same as that above.

This invention may be further developed within the scope of the following claims. Accordingly, it is desired that the foregoing description be read as being merely illustrative of an operative embodiment of this invention and not in a strictly limited sense.

Having fully described an operative embodiment of this invention, we now claim:

1. A chuck comprising a chuck body having an outer, chucking face and an opposite, inner face;
   a support plate arranged parallel and closely adjacent to said inner face, the plate being arranged for securement upon a fixed support;
   guide posts each having an end secured to said plate and extending through the chuck body and with their opposite, free ends being arranged at said outer face;
   the chuck body being slidable upon said posts toward and away from said plate;
   and limit means for limiting the movement of the chuck body away from said plate;
   work-piece rest pads secured upon the free ends of said guide posts and located a short distance outwardly of said outer face;
   spring means arranged between the chuck body and plate for normally spring holding them apart;
   chuck jaws slidably mounted upon said chuck outer face for movement towards and away from each other and for clamping and unclamping a work-piece therebetween;
   means for moving said jaws together and including a draw bar engaging the chuck body and arranged to be pulled towards said plate for moving the jaws together to clamp a work-piece and for pulling the chuck body, against the force of said spring means, towards the plate for thereby seating a clamped work-piece upon said rest.

2. A construction as defined in claim 1 and wherein the work-piece engaging surfaces of said rest pads are arranged parallel to the chuck body outer face.

3. A construction as defined in claim 1 and wherein said limit means comprises a shoulder forming enlargement formed on the free end of each guide post and cooperating shoulders formed in the chuck body.

4. A construction as defined in claim 1 and wherein said spring means comprises recesses formed in the chuck body and opening towards said plate and a compression spring means arranged in each of said recesses and engaging the plate and a portion of the chuck body for spring urging them apart.

5. A chuck comprising a cylindrically shaped chuck body having an outer, chucking face and an opposite, inner face;
   a support plate arranged parallel to and closely adjacent to said inner face and arranged for securement to a fixed support;
   a plurality of support posts, arranged perpendicular to said faces and each having an end secured to said plate and each extending through an opening formed transversely through said chuck body, with the chuck body being slidable upon said posts towards and away from said plates;
   said posts having enlarged shoulders formed thereon for engaging corresponding shoulders formed on the chuck body for limiting the movement of the chuck body away from the plate;
   and work-piece rest means formed upon the free end of each post;
   recesses formed in the chuck body inner face and opening towards said plate and spring means arranged within said recesses and engaging both the chuck body and the plate for spring urging them apart;
   chuck jaws slidably mounted upon said chuck outer faces for movement towards and away from each other for together clamping and unclamping a work-piece therebetween;
   means for moving said jaws towards each other, said means being operated by a draw bar arranged to be pulled perpendicularly of the chuck faces towards said plate, said draw bar further pulling the chuck body towards the plate for seating a clamped work-piece upon said rest means.

References Cited by the Examiner

UNITED STATES PATENTS

| | | | |
|---|---|---|---|
| 1,400,272 | 12/1921 | Ellis | 279—122 |
| 1,487,411 | 3/1924 | Wasson. | |
| 2,739,818 | 3/1956 | Benjamin | 279—2 |

ROBERT C. RIORDON, *Primary Examiner.*